US012747305B2

(12) United States Patent
Hiratani et al.

(10) Patent No.: US 12,747,305 B2
(45) Date of Patent: Sep. 29, 2026

(54) PHOTOCURABLE RESIN COMPOSITION, CURED PRODUCT THEREOF, AND METHOD FOR PRODUCING THREE-DIMENSIONAL OBJECT

(71) Applicant: CANON KABUSHIKI KAISHA, Tokyo (JP)

(72) Inventors: Takayuki Hiratani, Tokyo (JP); Kyohei Wada, Tokyo (JP); Ryo Ogawa, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 281 days.

(21) Appl. No.: 18/320,874

(22) Filed: May 19, 2023

(65) Prior Publication Data

US 2023/0287151 A1 Sep. 14, 2023

Related U.S. Application Data

(63) Continuation of application No. PCT/JP2021/042349, filed on Nov. 18, 2021.

(30) Foreign Application Priority Data

Nov. 24, 2020 (JP) ................................ 2020-194435
Nov. 12, 2021 (JP) ................................ 2021-184896

(51) Int. Cl.

| | |
|---|---|
| ***C08F 2/48*** | (2006.01) |
| ***C08F 220/18*** | (2006.01) |
| ***C08F 299/06*** | (2006.01) |

(52) U.S. Cl.

CPC .............. *C08F 2/48* (2013.01); *C08F 220/18* (2013.01); *C08F 299/06* (2013.01); *C08F 2400/00* (2013.01)

(58) Field of Classification Search

None

See application file for complete search history.

(56) References Cited

U.S. PATENT DOCUMENTS 10,927,199 B2 * 2/2021 Takagi ...................... C09C 3/08
11,840,015 B2 * 12/2023 Okamoto ............... B33Y 70/00

(Continued)

FOREIGN PATENT DOCUMENTS

JP 2004051665 A 2/2004
JP 2006002110 A 1/2006

(Continued)

*Primary Examiner* — Sanza L. McClendon

(74) *Attorney, Agent, or Firm* — Canon U.S.A., Inc. IP Division

(57) ABSTRACT

A photocurable resin composition includes, as a polyfunctional radical-polymerizable compound (A), a polyfunctional urethane (meth)acrylate (a1) intramolecularly including at least two (meth)acryloyl groups and two urethane groups and including a structure represented by General formula (1) or (2), wherein a content of the polyfunctional urethane (meth)acrylate (a1) relative to 100 parts by mass of a total amount of the polyfunctional radical-polymerizable compound (A) and a monofunctional radical-polymerizable compound (B) is 10 parts by mass or more and 60 parts by mass or less, and a content of rubber particles (C) relative to 100 parts by mass of the total amount of the polyfunctional radical-polymerizable compound (A) and the monofunctional radical-polymerizable compound (B) is 2 parts by mass or more and less than 18 parts by mass.

30 Claims, 1 Drawing Sheet

(56) References Cited

U.S. PATENT DOCUMENTS

| | | | | |
|---|---|---|---|---|
| 12,146,021 | B2 * | 11/2024 | Hiratani | C08G 18/8116 |
| 2004/0135292 | A1 | 7/2004 | Coats et al. | |
| 2019/0315981 | A1 * | 10/2019 | Nishiura | B33Y 10/00 |

FOREIGN PATENT DOCUMENTS

| | | | | |
|---|---|---|---|---|
| JP | 2008266551 | A | 11/2008 | |
| JP | 2019156932 | A | 9/2019 | |
| JP | 2020100705 | A | 7/2020 | |
| JP | 2020172103 | A | 10/2020 | |
| WO | 2018/020732 | A1 | 2/2018 | |
| WO | WO-2020085166 | A1 * | 4/2020 | C08F 290/06 |
| WO | 2020/241501 | A1 | 12/2020 | |

* cited by examiner

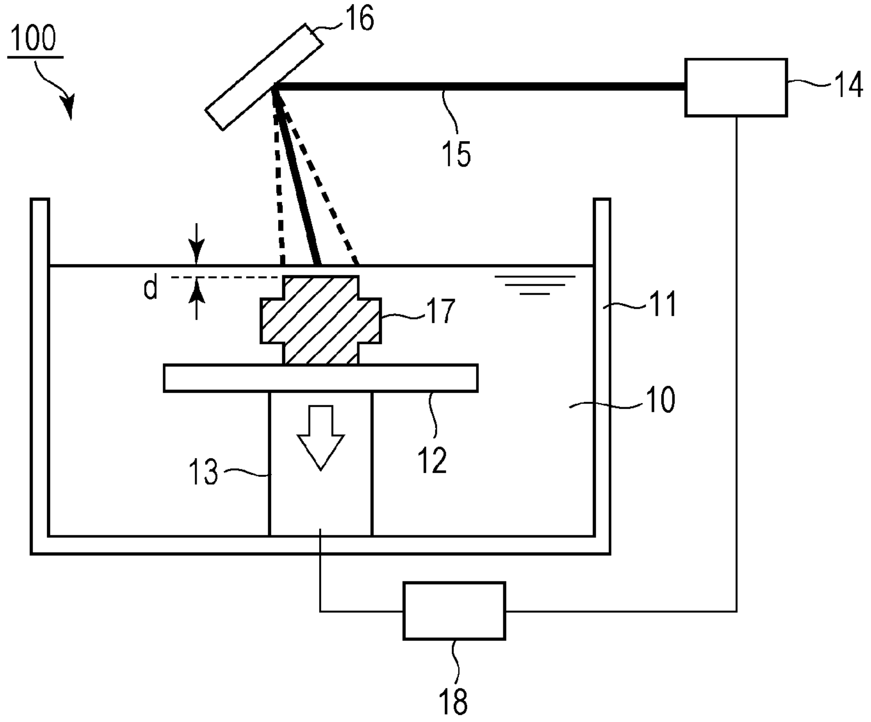
100
16
14
15
d
17
11
10
12
13
18

PHOTOCURABLE RESIN COMPOSITION, CURED PRODUCT THEREOF, AND METHOD FOR PRODUCING THREE-DIMENSIONAL OBJECT

CROSS-REFERENCE TO RELATED APPLICATIONS

This application is a Continuation of International Patent Application No. PCT/JP2021/042349, filed Nov. 18, 2021, which claims the benefit of Japanese Patent Application Nos. 2020-194435, filed Nov. 24, 2020 and 2021-184896, filed Nov. 12, 2021, all of which are hereby incorporated by reference herein in their entirety.

TECHNICAL FIELD

The present disclosure relates to a photocurable resin composition, a cured product of the photocurable resin composition, and a method for producing a three-dimensional object.

BACKGROUND ART

There is a known three-dimensional object optical fabrication method (hereafter, referred to as "stereolithography") of repeating a step of selectively irradiating a photocurable resin composition with light on the basis of the three-dimensional geometry of a three-dimensional model to form a cured resin layer, to thereby fabricate an object in which such cured resin layers are stacked and joined together. The stereolithography enables, using three-dimensional geometric data of three-dimensional models, easy fabrication of even three-dimensional objects having complicated geometries and hence has come to be applied to fabrication of prototypes for checking the geometries and working models or molds for checking the functionality. In recent years, the stereolithography has come to be applied to even fabrication of actual products.

Under such circumstances, there has been a demand for a photocurable resin composition that enables fabrication of objects having high impact resistance similar to that of general-purpose engineering plastics such as ABS and having high heat resistance preventing deformation even at relatively high temperatures. Such objects also desirably have high hardness that exhibits high stress against deformation, in other words, high moduli of elasticity.

Patent Literature 1 discloses a photocurable resin composition including a cationic-polymerizable compound (A) having two or more bisphenol structures and one or more hydroxyl groups, a cationic-polymerizable compound other than the component (A), a radical-polymerizable compound, and multilayered polymer particles.

CITATION LIST

Patent Literature

PTL 1: Japanese Patent Laid-Open No. 2008-266551

However, the cured products of the photocurable resin composition of PTL 1 are not sufficient from the viewpoint of providing both of mechanical strength and the moduli of elasticity suitable for fabrication of actual products. The moduli of elasticity are 2 GPa or more, which are high, but the impact resistance is much lower than that of ABS.

SUMMARY OF DISCLOSURE

An object of the present disclosure is to provide a photocurable resin composition that can provide a cured product having a high modulus of elasticity and high impact resistance.

A photocurable resin composition according to the present disclosure including a polyfunctional radical-polymerizable compound (A), a monofunctional radical-polymerizable compound (B), rubber particles (C) formed of a diene-based compound, and a radical polymerization initiator (D), wherein the photocurable resin composition comprises, as the polyfunctional radical-polymerizable compound (A), a polyfunctional urethane (meth)acrylate (a1) intramolecularly including at least two (meth)acryloyl groups and two urethane groups and including a structure represented by General formula (1) or (2), a content of the polyfunctional urethane (meth)acrylate (a1) relative to 100 parts by mass of a total amount of the polyfunctional radical-polymerizable compound (A) and the monofunctional radical-polymerizable compound (B) is 10 parts by mass or more and 60 parts by mass or less, and a content of the rubber particles (C) relative to 100 parts by mass of the total amount of the polyfunctional radical-polymerizable compound (A) and the monofunctional radical-polymerizable compound (B) is 2 parts by mass or more and less than 18 parts by mass.

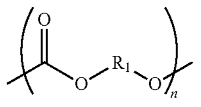

(1)

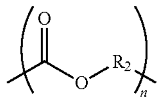

(2)

In General formulas (1) and (2), $R_1$ and $R_2$ are each independently a hydrocarbon group including an alkylene group having 1 to 18 carbon atoms and n is 2 to 50.

Further features of the present disclosure will become apparent from the following description of exemplary embodiments with reference to the attached drawing.

BRIEF DESCRIPTION OF DRAWING

FIGURE is a schematic view of an example of the configuration of a stereolithography apparatus.

DESCRIPTION OF EMBODIMENTS

Hereinafter, embodiments according to the present disclosure will be described. Note that the embodiments described below are mere examples and, without limiting descriptions, the present disclosure are not limited to these embodiments.

Photocurable Resin Composition

For a photocurable resin composition according to the present disclosure, appropriate amounts of a polyfunctional radical-polymerizable compound (A), a monofunctional radical-polymerizable compound (B), rubber particles (C), and a radical polymerization initiator (D) are placed into a stirring container and stirred. As needed, another component (E) may be added. The stirring temperature is ordinarily 20° C. or more and 120° C. or less, preferably 40° C. or more and 100° C. or less. Subsequently, as needed, the volatile solvent and the like are removed, so that the composition can be produced.

A photocurable resin composition according to the present disclosure is suitable as a fabrication material used for stereolithography. A photocurable resin composition according to the present disclosure in the case of being used as the fabrication material for stereolithography preferably has a viscosity at a shear rate of 5 $s^{-1}$ at 25° C. of 0.050 Pa·s or more and 5.0 Pa·s or less, more preferably 0.075 Pa·s or more and 4.5 Pa·s or less, still more preferably 0.075 Pa·s or more and 2.0 Pa·s or less.

Hereinafter, components included in a photocurable resin composition according to the present disclosure will be described in detail.

Polyfunctional Radical-Polymerizable Compound (A)

The polyfunctional radical-polymerizable compound (A) included in the photocurable resin composition is a compound intramolecularly including a plurality of radical-polymerizable functional groups. Hereafter, the polyfunctional radical-polymerizable compound (A) may be simply referred to as Compound (A).

A photocurable resin composition according to the present disclosure includes, as Compound (A), a polyfunctional urethane (meth)acrylate (a1) including intramolecularly at least two (meth)acryloyl groups and at least two urethane groups and including a structure represented by General formula (1) or (2).

(1)

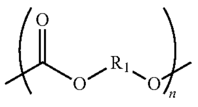

(2)

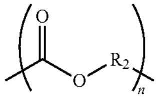

In General formulas (1) and (2), $R_1$ and $R_2$ are each independently a hydrocarbon group including an alkylene group having 1 to 18 carbon atoms and n is 2 to 50, preferably a hydrocarbon group including an alkylene group having 4 carbon atoms to 9 carbon atoms. $R_1$ and $R_2$ are any one or a combination of two or more selected from the group consisting of $—(CH_2)_m—$ (m=1 to 18), $—(CH_2)_hC(CH_3)_2(CH_2)_i—$ (h=0 to 15, i=0 to 15), and $—(CH_2)_jCH(CH_3)(CH_2)_k—$ (j=0 to 16, k=0 to 16). Of these, $R_1$ and $R_2$ each particularly preferably include $—(CH_2)_m—$ (m=4 to 9). $R_1$ and $R_2$ may include, in addition to the alkylene group, an aromatic hydrocarbon group.

As the polyfunctional urethane (meth)acrylate (a1), for example, a reaction product of a polyol-based compound, a hydroxyl group-containing (meth)acrylate-based compound, and a polyisocyanate-based compound can be used. Alternatively, a reaction product of a polyol-based compound and an isocyanate group-containing (meth)acrylate-based compound or a reaction product of a hydroxyl group-containing (meth)acrylate-based compound and a polyisocyanate-based compound can be used. Because high impact resistance tends to be provided, preferred is the reaction product of a hydroxyl group-containing (meth) acrylate-based compound, a polyisocyanate-based compound, and a polyol-based compound.

As the polyol-based compound, a polycarbonate-based polyol or polyester-based polyol including the above-described structure represented by General formula (1) or (2) can be used. These may be used alone or in combination of two or more thereof. The polyfunctional urethane (meth) acrylate (a1) formed from the polycarbonate-based polyol or polyester-based polyol is preferred from the viewpoint that a high modulus of elasticity and high impact strength tend to be both achieved. In particular, the polycarbonate-based polyol is preferred because, compared with the polyester-based polyol, it provides a strong intermolecular interaction and tends to provide a high modulus of elasticity without lowering of the impact strength.

Other examples of the polyol-based compound include polyether-based polyols, polyolefin-based polyols, and (meth)acrylic-based polyols. Such a polyol-based compound may be used in combination with a polycarbonate-based polyol and/or a polyester-based polyol.

In the case of using a combination of a polycarbonate-based polyol or polyester-based polyol and another polyol compound, the amount of the polycarbonate-based polyol or polyester-based polyol relative to 100 parts by mass of the total amount of the polyol compounds is preferably 20 parts by mass or more, more preferably 30 parts by mass or more. The amount of the polycarbonate-based polyol or polyester-based polyol is preferably 20 parts by mass or more because both of a high modulus of elasticity and high impact strength tend to be provided.

The polycarbonate-based polyol is a compound intramolecularly including a carbonate bond and including a hydroxyl group at an end or a side chain, and the compound may include, in addition to the carbonate bond, an ester bond. Examples of the polycarbonate-based polyol include reaction products of polyhydric alcohol and phosgene and ring-opened polymers of cyclic carbonates (such as alkylene carbonates).

The polyester-based polyol is a compound intramolecularly including an ester bond and including a hydroxyl group at an end or a side chain. Examples include polycondensation products of polyhydric alcohol and polycarboxylic acid, ring-opened polymers of cyclic esters (lactones), and reaction products of three components that are polyhydric alcohol, polycarboxylic acid, and cyclic ester.

Examples of the polyhydric alcohol include ethylene glycol, diethylene glycol, propylene glycol, dipropylene glycol, trimethylene glycol, 1,4-tetramethylenediol, 1,3-tetramethylenediol, 2-methyl-1,3-trimethylenediol, 1,5-pentamethylenediol, neopentyl glycol, 1,6-hexamethylenediol, 3-methyl-1,5-pentamethylenediol, 2,4-diethyl-1,5-pentamethylenediol, glycerol, trimethylolpropane, trimethylolethane, cyclohexanediols (such as 1,4-cyclohexanediol), bisphenols (such as bisphenol A), and sugar alcohols (such as xylitol and sorbitol).

Examples of the alkylene carbonates include ethylene carbonate, trimethylene carbonate, tetramethylene carbonate, and hexamethylene carbonate.

Examples of the polycarboxylic acid include aliphatic dicarboxylic acids such as malonic acid, maleic acid, fumaric acid, succinic acid, glutaric acid, adipic acid, suberic acid, azelaic acid, sebacic acid, and dodecanedioic acid, alicyclic dicarboxylic acids such as 1,4-cyclohexanedicarboxylic acid, and aromatic dicarboxylic acids such as terephthalic acid, isophthalic acid, orthophthalic acid, 2, 6-naphthalenedicarboxylic acid, p-phenylenedicarboxylic acid, and trimellitic acid.

Examples of the cyclic ester include propiolactone, β-methyl-δ-valerolactone, and ε-caprolactone.

Examples of the hydroxyl group-containing (meth)acrylate-based compound include hydroxyalkyl (meth)acrylates such as 2-hydroxyethyl (meth)acrylate, 2-hydroxypropyl (meth)acrylate, 2-hydroxybutyl (meth)acrylate, 4-hydroxybutyl (meth)acrylate, and 6-hydroxyhexyl (meth)acrylate, 2-hydroxyethylacryloyl phosphate, 2-(meth)acryloyloxyethyl-2-hydroxypropyl phthalate, caprolactone-modified 2-hydroxyethyl (meth)acrylate, dipropylene glycol (meth) acrylate, fatty acid-modified-glycidyl (meth)acrylate, polyethylene glycol mono(meth)acrylate, polypropylene glycol mono(meth)acrylate, 2-hydroxy-3-(meth)acryloyloxypropyl (meth)acrylate, glycerol di(meth)acrylate, 2-hydroxy-3-acryloyl-oxypropyl (meth)acrylate, pentaerythritol tri(meth) acrylate, caprolactone-modified pentaerythritol tri(meth) acrylate, ethylene oxide-modified pentaerythritol tri(meth) acrylate, dipentaerythritol penta(meth)acrylate, caprolactone-modified dipentaerythritol penta(meth)acrylate, and ethylene oxide-modified dipentaerythritol penta (meth)acrylate. Such hydroxyl group-containing (meth) acrylate-based compounds may be used alone or in combination of two or more thereof.

Examples of the polyisocyanate-based compound include aromatic polyisocyanates such as tolylene diisocyanate, diphenylmethane diisocyanate, polyphenylmethane polyisocyanate, modified diphenylmethane diisocyanate, xylylene diisocyanate, tetramethylxylylene diisocyanate, phenylene diisocyanate, and naphthalene diisocyanate, aliphatic polyisocyanates such as pentamethylene diisocyanate, hexamethylene diisocyanate, trimethylhexamethylene diisocyanate, lysine diisocyanate, and lysine triisocyanate, alicyclic polyisocyanates such as hydrogenated diphenylmethane diisocyanate, hydrogenated xylylene diisocyanate, isophorone diisocyanate, norbornene diisocyanate, and 1,3-bis (isocyanatomethyl)cyclohexane, trimer compounds or polymer compounds of such polyisocyanates, allophanate-type polyisocyanates, biuret-type polyisocyanates, and water-dispersion-type polyisocyanates. Such polyisocyanate-based compounds may be used alone or in combination of two or more thereof.

Examples of the isocyanate group-containing (meth)acrylate-based compound include 2-isocyanatoethyl (meth)acrylate and 1,1-(bisacryloyloxymethyl)ethyl isocyanate. Such isocyanate group-containing (meth)acrylate-based compounds may be used alone or in combination of two or more thereof.

The polyfunctional urethane (meth)acrylate (a1) of the photocurable resin composition preferably has a weight-average molecular weight of 1000 or more and 60000 or less, more preferably 2000 or more and 50000 or less. When the weight-average molecular weight is 1000 or more, with a decrease in the crosslinking density, the cured product tends to have considerably improved impact resistance; when the weight-average molecular weight is more than 60000, the curable composition tends to have an increased viscosity. Note that, in the present disclosure, the phrase "or more" includes "more than" and the phrase "or less" includes "less than".

The weight-average molecular weight (Mw) of the polyfunctional urethane (meth)acrylate (a1) is the weight-average molecular weight determined by molecular-weight calibration using polystyrene standards. The weight-average molecular weight can be measured using a high-performance liquid chromatography. For example, the weight-average molecular weight can be measured using a high-performance GPC apparatus "HLC-8220GPC" manufactured by Tosoh Corporation and two columns of Shodex GPCLF-804 (exclusion limit molecular weight: $2\times10^6$, separation range: 300 to $2\times10^6$) connected in series.

The polyfunctional urethane (meth)acrylate (a1) preferably has a radical-polymerizable functional group equivalent of 300 g/eq or more. When the radical-polymerizable functional group equivalent is less than 300 g/eq, with an increase in the crosslinking density, the impact resistance tends to degrade. Note that the radical-polymerizable functional group equivalent is a value of the molecular weight per radical-polymerizable functional group.

In the photocurable resin composition, the content of the polyfunctional urethane (meth)acrylate (a1) relative to 100 parts by mass of the total amount of the polyfunctional radical-polymerizable compound (A) and the monofunctional radical-polymerizable compound (B) is 10 parts by mass or more and 60 parts by mass or less, preferably 15 parts by mass or more and 45 parts by mass or less, more preferably 15 parts by mass or more and 40 parts by mass or less. When the content of the polyfunctional urethane (meth) acrylate (a1) is in such a range, both of high impact resistance and high heat resistance can be provided. When the content of the polyfunctional urethane (meth)acrylate (a1) is less than 10 parts by mass, the impact resistance tends to considerably degrade. When the content of the polyfunctional urethane (meth)acrylate (a1) is more than 60 parts by mass, the heat resistance tends to degrade and the viscosity of the resin composition tends to become higher than the range suitable for the material for stereolithography.

The photocurable resin composition may contain, as the polyfunctional radical-polymerizable compound (A), one or two or more polyfunctional radical-polymerizable compounds (a2) other than the polyfunctional urethane (meth) acrylate (a1). In the photocurable resin composition, the radical-polymerizable functional group of the polyfunctional radical-polymerizable compound (a2) may be an ethylenically unsaturated group. Examples of the ethylenically unsaturated group include a (meth)acryloyl group and a vinyl group. Examples of the polyfunctional radical-polymerizable compound (a2) include polyfunctional (meth) acrylate-based compounds, vinyl ether group-containing (meth)acrylate-based compounds, polyfunctional (meth) acryloyl group-containing isocyanurate-based compounds, polyfunctional (meth)acrylamide-based compounds, polyfunctional maleimide-based compounds, polyfunctional vinyl ether-based compounds, and polyfunctional aromatic vinyl-based compounds.

Examples of the polyfunctional (meth)acrylate-based compounds include ethylene glycol di(meth)acrylate, diethylene glycol di(meth)acrylate, triethylene glycol di(meth) acrylate, tetraethylene glycol di(meth)acrylate, nonaethylene glycol di(meth)acrylate, 1,3-butylene glycol di(meth) acrylate, 1,4-butanediol di(meth)acrylate, dimethyloltricyclodecane di(meth)acrylate, trimethylolpropane tri(meth)acrylate, neopentyl glycol di(meth)acrylate, 1,6-hexamethylene di(meth)acrylate, hydroxypivalate neopentyl glycol di(meth)acrylate, pentaerythritol tri(meth) acrylate, pentaerythritol tetra(meth)acrylate, ditrimethylolpropane tetraacrylate, dipentaerythritol tetra(meth)acrylate, dipentaerythritol penta(meth)acrylate, dipentaerythritol hexa(meth)acrylate, di(meth)acrylate of ε-caprolactone-adduct hydroxypivalate neopentyl glycol (for example, KAYARAD HX-220, HX-620, and the like manufactured by Nippon Kayaku Co., Ltd.), di(meth)acrylate of EO-adduct bisphenol A, polyfunctional (meth)acrylate including a fluorine atom, polyfunctional (meth)acrylate including a siloxane structure, polycarbonatediol di(meth)acrylate, polyester di(meth)acrylate, polyethylene glycol di(meth)acrylate, polyether-based polyfunctional urethane (meth)acrylate, polyolefin-based polyfunctional urethane (meth)acrylate, and (meth)acrylic-based polyfunctional urethane (meth)acrylate.

Examples of the vinyl ether group-containing (meth)acrylate-based compounds include 2-vinyloxyethyl (meth)acrylate, 4-vinyloxybutyl (meth)acrylate, 4-vinyloxycyclohexyl (meth)acrylate, 2-(vinyloxyethoxy)ethyl (meth)acrylate, and 2-(vinyloxyethoxyethoxyethoxy)ethyl (meth)acrylate.

Examples of the polyfunctional (meth)acryloyl group-containing isocyanurate-based compounds include tri(acryloyloxyethyl) isocyanurate, tri(methacryloyloxyethyl) isocyanurate, and ε-caprolactone-modified tris-(2-acryloxyethyl) isocyanurate.

Examples of the polyfunctional (meth)acrylamide-based compounds include N,N'-methylenebisacrylamide, N,N'-ethylenebisacrylamide, N,N'-(1,2-dihydroxyethylene) bisacrylamide, N,N'-methylenebismethacrylamide, and N,N',N"-triacryloyldiethylenetriamine.

Examples of the polyfunctional maleimide-based compounds include 4,4'-diphenylmethanebismaleimide, m-phenylenebismaleimide, bisphenol A diphenyl ether bismaleimide, 3,3'-dimethyl-5,5'-diethyl-4,4'-diphenylmethanebismaleimide, 4-methyl-1,3-phenylenebismaleimide, and 1,6-bismaleimide-(2,2,4-trimethyl) hexane.

Examples of the polyfunctional vinyl ether-based compounds include ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ether, bisphenol F alkylene oxide divinyl ether, trimethylolpropane trivinyl ether, ditrimethylolpropane tetravinyl ether, glycerol trivinyl ether, pentaerythritol tetravinyl ether, dipentaerythritol pentavinyl ether, and dipentaerythritol hexavinyl ether.

Examples of the polyfunctional aromatic vinyl-based compounds include divinylbenzene.

When the photocurable resin composition contains the polyfunctional radical-polymerizable compound (a2) having a radical-polymerizable functional group equivalent of less than 300 g/eq, its content relative to 100 parts by mass of the total amount of the polyfunctional radical-polymerizable compound (A) and the monofunctional radical-polymerizable compound (B) is preferably 20 parts by mass or less, more preferably 18 parts by mass or less, still more preferably 15 parts by mass or less.

When the content of the polyfunctional radical-polymerizable compound (a2) having a radical-polymerizable functional group equivalent of less than 300 g/eq is more than 20 parts by mass, the cured product has increased crosslinking density and the crosslinking density tends to become uneven. Thus, application of impact from the outside causes generation of a region where stress is concentrated, so that the effect of improving the impact resistance due to addition of rubber particles may not be provided and the Charpy impact strength may be similar to that in the related art.

When the photocurable resin composition contains the polyfunctional radical-polymerizable compound (a2) having a radical-polymerizable functional group equivalent of 300 g/eq or more, its content relative to 100 parts by mass of the total amount of the polyfunctional radical-polymerizable compound (A) and the monofunctional radical-polymerizable compound (B) is preferably 40 parts by mass or less, more preferably 35 parts by mass or less. When the content of the polyfunctional radical-polymerizable compound (a2) having a radical-polymerizable functional group equivalent of 300 g/eq or more is more than 40 parts by mass, the heat resistance tends to degrade and the resultant cured product tends to have a considerably decreased modulus of elasticity.

Monofunctional Radical-Polymerizable Compound (B)

In the photocurable resin composition, the monofunctional radical-polymerizable compound (B) is a compound intramolecularly having a single radical-polymerizable functional group alone. Hereafter, the monofunctional radical-polymerizable compound (B) may be simply referred to as Compound (B).

Examples of the radical-polymerizable functional group include ethylenically unsaturated groups. Specific examples of the ethylenically unsaturated groups include a (meth)acryloyl group and a vinyl group. Note that, in this Description, the (meth)acryloyl group means an acryloyl group or a methacryloyl group.

Examples of the monofunctional radical-polymerizable compound (B) including a (meth)acryloyl group include monofunctional (meth)acrylamide-based compounds and monofunctional (meth)acrylate-based compounds.

Examples of the monofunctional (meth)acrylamide-based compounds include (meth)acrylamide, N-methyl(meth)acrylamide, N-isopropyl(meth)acrylamide, N-tert-butyl (meth)acrylamide, N-phenyl(meth)acrylamide, N-methylol (meth)acrylamide, N,N-diacetone(meth)acrylamide, N,N-dimethyl(meth)acrylamide, N,N-diethyl(meth)acrylamide, N,N-dipropyl(meth)acrylamide, N,N-dibutyl(meth)acrylamide, N-(meth)acryloylmorpholine, N-(meth)acryloylpiperidine, and N-[3-(dimethylamino)propyl]acrylamide.

Examples of the monofunctional (meth)acrylate-based compounds include methyl (meth)acrylate, ethyl (meth)acrylate, n-butyl (meth)acrylate, isobutyl (meth)acrylate, t-butyl (meth)acrylate, 2-ethylhexyl (meth)acrylate, n-octyl (meth)acrylate, i-octyl (meth)acrylate, lauryl (meth)acrylate, stearyl (meth)acrylate, cyclohexyl (meth)acrylate, isobornyl (meth)acrylate, adamantyl (meth)acrylate, 2-hydroxyethyl (meth)acrylate, 2-hydroxypropyl (meth)acrylate, 2-hydroxybutyl (meth)acrylate, 4-hydroxybutyl (meth)acrylate, glycidyl (meth)acrylate, 3-methyl-3-oxetanyl-methyl (meth)acrylate, tetrahydrofurfuryl (meth)acrylate, phenylglycidyl (meth)acrylate, dimethylaminomethyl (meth)acrylate, phenyl cellosolve (meth)acrylate, dicyclopentenyl (meth)acrylate, dicyclopentenyloxyethyl (meth)acrylate, biphenyl (meth)acrylate, 2-hydroxyethyl (meth)acryloyl phosphate, phenyl (meth)acrylate, phenoxyethyl (meth)acrylate, phenoxypropyl (meth)acrylate, benzyl (meth)acrylate, butoxytriethylene glycol (meth)acrylate, 2-ethylhexylpolyethylene glycol (meth)acrylate, nonylphenylpolypropylene glycol (meth)acrylate, methoxydipropylene glycol (meth)acrylate, glycidyl (meth)acrylate, glycerol (meth)acrylate, trifluoromethyl (meth)acrylate, trifluoroethyl (meth)acrylate, tetrafluoropropyl (meth)acrylate, octafluoropentyl acrylate, polyethylene glycol (meth)acrylate, polypropylene glycol (meth)acrylate, allyl (meth)acrylate, epichlorohydrin-modified butyl (meth)acrylate, epichlorohydrin-modified phenoxy (meth)acrylate, ethylene oxide (EO)-modified phthalic acid (meth)acrylate, EO-modified succinic acid (meth)acrylate, caprolactone-modified 2-hydroxyethyl (meth)acrylate, N,N-dimethylaminoethyl (meth)acrylate, N,N-diethylaminoethyl (meth)acrylate, morpholine (meth)acrylate, EO-modified phosphoric acid (meth)acrylate, allyloxymethyl acrylate (product name: AO-MA, manufactured by NIPPON SHOKUBAI CO., LTD.), monofunctional (meth)acrylates including an imide group (product name: M-140, manufactured by TOAGOSEI CO., LTD.), and monofunctional (meth)acrylates including a siloxane structure.

Examples of the monofunctional radical-polymerizable compound including an ethylenically unsaturated group other than the (meth)acryloyl group include styrene derivatives such as styrene, vinyltoluene, α-methylstyrene, chlorostyrene, styrenesulfonic acid, and salts of the foregoing, maleimides such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide, vinyl esters such as vinyl acetate, vinyl propionate, vinyl pivalate, vinyl benzoate, and vinyl cinnamate, vinyl cyanide compounds such as (meth)acrylonitrile, and N-vinyl compounds such as N-vinylpyrrolidone, N-vinyl-ε-caprolactam, N-vinylimidazole, N-vinylmorpholine, N-vinylacetamide, and vinylmethyloxazolidinone.

Such monofunctional radical-polymerizable compounds may be used alone or in combination of two or more thereof.

In the photocurable resin composition, the content of the monofunctional radical-polymerizable compound (B) relative to 100 parts by mass of the total amount of the polyfunctional radical-polymerizable compound (A) and the monofunctional radical-polymerizable compound (B) is preferably 40 parts by mass or more and 85 parts by mass or less, more preferably 45 parts by mass or more and 80 parts by mass or less.

From the viewpoint of increasing the curing speed, as the monofunctional radical-polymerizable compound, at least one compound selected from the group consisting of a monofunctional acrylamide-based compound, a monofunctional acrylate-based compound, and an N-vinyl compound is preferably contained. In particular, a monofunctional acrylamide-based compound or an N-vinyl compound is preferably contained. From the viewpoint of a tendency in which both of high heat resistance and high impact strength are provided, the monofunctional acrylamide-based compound preferably includes a cyclic structure, such as acryloyl morpholine or phenylacrylamide. The N-vinyl compound preferably includes a cyclic structure, such as N-vinylpyrrolidone, N-vinyl-ε-caprolactam, N-vinylimidazole, N-vinylmorpholine, or vinylmethyloxazolidinone.

In the case of using, as the monofunctional radical-polymerizable compound (B), an N-vinyl compound, the content of the N-vinyl group relative to the total amount of the radical-polymerizable functional group in the photocurable resin composition is preferably 80 mol % or less, more preferably 75 mol % or less. Homopolymerization of the N-vinyl compound is difficult and the content of the N-vinyl group relative to the total amount of the radical-polymerizable functional group can be set to 80 mol % or less, so that curing is considerably promoted and the fabrication material suitable for stereolithography can be provided, which is preferred.

In the case of using, as the monofunctional radical-polymerizable compound (B), a monofunctional methacrylate-based compound, when the content of the methacrylate group relative to the total amount of the radical-polymerizable functional group in the photocurable resin composition is 25 mol % or less, the curing speed tends to be increased, which is preferred. The content of the methacrylate group is more preferably 20 mol % or less, or 0 mol %. When the content of the methacrylate group is more than 20 mol %, the curing speed tends to considerably decrease and the fabrication material is not suitable for stereolithography, which is not preferred.

The photocurable resin composition may not or may include a monofunctional radical-polymerizable compound including an alicyclic hydrocarbon group; in the case of including the compound, its content relative to 100 parts by mass of the total amount of the polyfunctional radical-polymerizable compound (A) and the monofunctional radical-polymerizable compound (B) is preferably 50 parts by mass or less, more preferably 40 parts by mass or less. When the content of the monofunctional radical-polymerizable compound including an alicyclic hydrocarbon group is more than 50 parts by mass, the effect of improving the impact resistance tends not to be provided. In addition, during addition of the rubber particles (C), the photocurable resin composition tends to have an increased viscosity and become less handleable. For example, in the case of using the photocurable resin composition as a fabrication material for stereolithography, its high viscosity may result in increased fabrication time or difficulty in achieving fabrication itself.

Examples of the monofunctional radical-polymerizable compound including an alicyclic hydrocarbon group include isobornyl (meth)acrylate, dicyclopentanyl (meth)acrylate, dicyclopentenyl (meth)acrylate, cyclohexyl (meth)acrylate, 4-t-butylcyclohexyl acrylate, 3,3,5-trimethylcyclohexyl acrylate, 2-methyl-2-adamantyl (meth)acrylate, and 2-ethyl-2-adamantyl (meth)acrylate.

The homopolymer or copolymer of the monofunctional radical-polymerizable compound (B) preferably has a glass transition temperature (Tg) of 70° C. or more, more preferably 80° C. or more. The Tg of a copolymer can be determined by FOX equation (Formula (1)). Tg is described in units of absolute temperature.

$$1/Tg=\Sigma(W_i/Tg_i) \quad \text{Formula (1)}$$

In Formula (1) above, $W_i$ is the mass ratios of the monofunctional radical-polymerizable compounds in the copolymer; $Tg_i$ is the glass transition temperatures (in units of absolute temperature) of the homopolymers of the monofunctional radical-polymerizable compounds. As the glass transition temperatures ($Tg_i$) of the homopolymers of the radical-polymerizable compounds used for FOX equation, the generally known values of the polymers can be employed. Alternatively, polymers may be actually produced and measured values obtained by differential scanning calorimetry (DSC) or dynamic viscoelasticity measurement (DMA) may be used.

Rubber Particles (C)

The photocurable resin composition is made to contain rubber particles (C), to thereby provide a cured product having improved impact resistance.

The composition forming the rubber particles included in the photocurable resin composition is a diene-based compound. Examples of the rubber particles formed of a diene-based compound include butadiene rubber, crosslinked butadiene rubber, styrene/butadiene copolymer rubber, acrylonitrile/butadiene copolymer rubber, isoprene rubber, chloroprene rubber, and natural rubber. The rubber particles are preferably formed of one of such compositions or a combination of two or more of such compositions. In particular, from the viewpoint of improving the impact resistance and suppressing the increase in the viscosity of the photocurable resin composition, the rubber particles particularly preferably include at least one selected from the group consisting of butadiene rubber, crosslinked butadiene rubber, and styrene/butadiene copolymer rubber.

The composition of the rubber particles preferably has a glass transition temperature of 0° C. or less, more preferably −5° C. or less. When the glass transition temperature is more than 0° C., the effect of improving the impact resistance tends not to be provided. The glass transition temperature of the composition of the rubber particles can be determined by, for example, differential scanning calorimetry (DSC) or dynamic viscoelasticity measurement (DMA).

The rubber particles are more preferably rubber particles having a core-shell structure. Specifically, the rubber particles preferably include a core including the above-described rubber and further includes a shell covering the exterior (surface) of the core and formed of a polymer of a radical-polymerizable compound. Use of such rubber particles having a core-shell structure can provide an appropriately increased dispersibility of the rubber particles in the resin composition, which can provide further improved impact resistance.

The polymer of the radical-polymerizable compound forming the shell preferably has a form of being graft-polymerized via chemical bonds to the surface of the core and covering at least a portion of the core. The rubber particles having a core-shell structure formed by graft polymerization of the shell to the core can be formed by performing, in the presence of particles serving as cores, graft polymerization of a radical-polymerizable compound by a publicly known method. For example, the rubber particles can be produced in the following manner: to latex particles that can be prepared by emulsion polymerization, mini-emulsion polymerization, suspension polymerization, seed polymerization, or the like and are dispersed in water, a radical-polymerizable compound serving as the constituent material of the shells can be added and polymerized.

Note that, when the surfaces of the cores have no or a very small amount of reactive moieties for graft polymerization of shells, such as ethylenically unsaturated groups, intermediate layers containing reactive moieties may be formed on the surfaces of particles that are to serve as the cores before graft polymerization of the shells. In other words, forms of the rubber particles having a core-shell structure include such a form in which the shell is formed on the core with the intermediate layer disposed therebetween.

As the radical-polymerizable compound forming the shells, a monofunctional radical-polymerizable compound intramolecularly having a single radical-polymerizable functional group can be suitably used. Rubber particles including shells including a polymer of a monofunctional radical-polymerizable compound exhibits high dispersibility in the case of being dispersed in a resin composition including a radical-polymerizable compound. Such rubber particles are preferred also from the viewpoint that high impact resistance tends to be provided.

The monofunctional radical-polymerizable compound used for forming the shells can be appropriately selected in consideration of compatibility with the composition forming the cores and dispersibility in the resin composition. For example, one or a combination of two or more selected from the materials described as examples of the monofunctional radical-polymerizable compound (B) may be used. When the shells include a polymer of a monofunctional radical-polymerizable compound including a (meth)acryloyl group, the rubber particles exhibit high dispersibility in the photocurable resin composition and an increase in the viscosity of the photocurable resin composition tends to be suppressed, which is preferred.

As the radical-polymerizable compound for forming the shells, a monofunctional radical-polymerizable compound and a polyfunctional radical-polymerizable compound may be used in combination. When a polyfunctional radical-polymerizable compound is used to form the shells, the photocurable resin composition tends to have a low viscosity and become easy to handle. On the other hand, when the content of the polyfunctional radical-polymerizable compound is excessively high, the effect of improving the impact resistance due to addition of rubber particles having a core-shell structure tends not to be provided. For this reason, in the case of using a polyfunctional radical-polymerizable compound for forming the shells, the amount of the polyfunctional radical-polymerizable compound relative to 100 parts by mass of the radical-polymerizable compound used for forming the shells is preferably 40 parts by mass or less, more preferably 30 parts by mass or less, still more preferably 25 parts by mass or less. Note that the polyfunctional radical-polymerizable compound used for forming the shells can be appropriately selected in consideration of compatibility with the composition forming the cores and the dispersibility in the resin composition. One or a combination of two or more selected from the materials described as examples of the polyfunctional urethane (meth)acrylate (a1) and the polyfunctional radical-polymerizable compound (a2) may be used.

In the rubber particles having a core-shell structure, the core-shell mass ratio of the shells to 100 parts by mass of the cores is preferably 1 part by mass or more and 200 parts by mass or less, more preferably 2 parts by mass or more and 180 parts by mass or less. When the core-shell mass ratio is in such a range, the addition to a photocurable resin composition can effectively improve the impact resistance. When the amount of the shells is less than 1 part by mass, the dispersibility of the rubber particles in the photocurable resin composition is not sufficient, so that the effect of improving the impact resistance tends not to be provided. When the amount of the shells is more than 200 parts by mass, the rubber particles are thickly covered with the shells, which reduces the effect of improving the impact resistance due to the rubber component. In order to provide sufficient impact resistance, a large amount of rubber particles need to be added; addition of a large amount of rubber particles tends to result in an increase in the viscosity of the photocurable resin composition and difficulty in handling.

The rubber particles preferably have an average particle size of 20 nm or more and 10 μm or less, or 50 nm or more and 5 μm or less. When the average particle size is less than 20 nm, the increase in the viscosity of the photocurable resin composition due to the addition or the interaction between rubber particles due to the increase in the specific surface area of the rubber particles tends to cause degradation of the heat resistance or degradation of the impact resistance of the cured product.

When the average particle size is more than 10 μm, the surface area (specific surface area) of the contact interface between such a rubber particle (rubber component) and the cured product of the photocurable resin composition is excessively reduced, so that the effect of improving the impact resistance due to addition of the rubber particles tends to be reduced. The average particle size used herein means an arithmetic (number) average particle size and can be measured by the dynamic light scattering method. For example, the average particle size can be measured for rubber particles dispersed in an appropriate organic solvent, using a particle sizing apparatus.

The rubber particles preferably have a gel fraction of 5% or more. When the gel fraction is less than 5%, the impact resistance and the heat resistance tend to degrade, which is not preferred. The gel fraction can be determined in the following manner. $W_1$ [g] of dry rubber particles are immersed in a sufficient amount of toluene and left at room temperature for 7 days. Subsequently, the solid content is separated by centrifugation or the like and dried at 100° C.

for 2 hours; the amount of the solid content after the drying is measured. The mass of the solid content after the drying is denoted by $W_2$ [g] and the following formula can be used to determine the gel fraction.

$$\text{Gel fraction (\%)} = W_2/W_1 \times 100$$

In the photocurable resin composition, the content of the rubber particles relative to 100 parts by mass of the total amount of the radical-polymerizable compound is 2 parts by mass or more and less than 18 parts by mass, preferably 3 parts by mass or more and 16 parts by mass or less. When the content of the rubber particles is less than 2 parts by mass, the effect of improving the impact resistance due to addition of the rubber particles is not provided. When the content of the rubber particles is 18 parts by mass or more, the resultant cured product has a considerably decreased modulus of elasticity. In addition, rubber particles are positioned close to each other and hence interact more strongly, so that the photocurable resin composition has considerably increased viscosity and becomes difficult to handle.

Radical Polymerization Initiator (D)

As the radical polymerization initiator (D), a photo-radical polymerization initiator or a thermal radical polymerization initiator can be used.

Photo-radical polymerization initiators are mainly classified into the intramolecular cleavage type and the hydrogen abstraction type. In the case of the intramolecular-cleavage-type photo-radical polymerization initiators, such an initiator absorbs light at a specific wavelength, so that a bond in a specific moiety is broken; at the moiety of the breakage, a radical is generated and serves as a polymerization initiator to initiate polymerization of an ethylenically unsaturated compound containing a (meth)acryloyl group. On the other hand, in the case of the hydrogen abstraction type, absorption of light at a specific wavelength occurs, which results in an excitation state; the excitation species causes a reaction of abstracting hydrogen from the surrounding hydrogen donor, to generate a radical; the radical serves as a polymerization initiator to initiate polymerization of the radical-polymerizable compound.

As the intramolecular-cleavage-type photo-radical polymerization initiators, alkylphenone-based photo-radical polymerization initiators, acylphosphine oxide-based photo-radical polymerization initiators, and oxime ester-based photo-radical polymerization initiators are known. Such an initiator undergoes a cleavage of a bond adjacent to a carbonyl group, to generate a radical species. Examples of the alkylphenone-based photo-radical polymerization initiators include benzylmethylketal-based photo-radical polymerization initiators, α-hydroxyalkylphenone-based photo-radical polymerization initiators, and aminoalkylphenone-based photo-radical polymerization initiators. For non-limiting specific compounds, examples of the benzylmethylketal-based photo-radical polymerization initiators include 2,2'-dimethoxy-1,2-diphenylethan-1-one (IRGACURE (registered trademark) 651, manufactured by BASF); examples of the α-hydroxyalkylphenone-based photo-radical polymerization initiators include 2-hydroxy-2-methyl-1-phenylpropan-1-one (DAROCUR 1173, manufactured by BASF), 1-hydroxycyclohexyl phenyl ketone (IRGACURE 184, manufactured by BASF), 1-[4-(2-hydroxyethoxy)phenyl]-2-hydroxy-2-methyl-1-propan-1-one (IRGACURE 2959, manufactured by BASF), and 2-hydroxy-1-{4-[4-(2-hydroxy-2-methylpropionyl)benzyl]phenyl}-2-methylpropan-1-one (IRGACURE 127, manufactured by BASF); examples of the aminoalkylphenone-based photo-radical polymerization initiators include 2-methyl-1-(4-methylthiophenyl)-2-morpholinopropan-1-one (IRGACURE 907, manufactured by BASF) and 2-benzylmethyl-2-dimethylamino-1-(4-morpholinophenyl)-1-butanone (IRGACURE 369, manufactured by BASF). Non-limiting examples of the acylphosphine oxide-based photo-radical polymerization initiators include 2,4,6-trimethylbenzoyldiphenylphosphine oxide (Lucirin TPO, manufactured by BASF) and bis(2,4,6-trimethylbenzoyl)-phenylphosphine oxide (IRGACURE 819, manufactured by BASF). Non-limiting examples of the oxime ester-based photo-radical polymerization initiators include (2E)-2-(benzoyloxyimino)-1-[4-(phenylthio)phenyl]octan-1-one (IRGACURE OXE-01, manufactured by BASF). Within the parentheses, examples of trade names are also described.

Non-limiting examples of the hydrogen-abstraction-type radical polymerization initiators include anthraquinone derivatives such as 2-ethyl-9,10-anthraquinone and 2-t-butyl-9,10-anthraquinone and thioxanthone derivatives such as isopropylthioxanthone and 2,4-diethylthioxanthone. Such photo-radical polymerization initiators may be used alone or in combination of two or more thereof. They may be used in combination with thermal radical polymerization initiators described later.

The amount of the photo-radical polymerization initiator added relative to 100 parts by mass of the radical-polymerizable compound included in the photocurable resin composition is preferably 0.1 parts by mass or more and 15 parts by mass or less, more preferably 0.1 parts by mass or more and 10 parts by mass or less. When the amount of the photo-radical polymerization initiator is small, polymerization tends to become insufficient. In the case of excessively adding the polymerization initiator, the molecular weight may not increase and the heat resistance or the impact resistance may degrade. The radical-polymerizable compound used herein refers to collectively the polyfunctional radical-polymerizable compound (A) and the monofunctional radical-polymerizable compound (B).

The thermal radical polymerization initiator can be, without particular limitations, any known compound that generates a radical upon heating; preferred examples include azo-based compounds, peroxides, and persulfates. Examples of the azo-based compounds include 2,2'-azobisisobutyronitrile, 2,2'-azobis(methylisobutyrate), 2,2'-azobis-2,4-dimethylvaleronitrile, and 1,1'-azobis(1-acetoxy-1-phenylethane). Examples of the peroxides include benzoyl peroxide, di-t-butylbenzoyl peroxide, t-butyl peroxypivalate, and di(4-t-butylcyclohexyl) peroxydicarbonate. Examples of the persulfates include persulfates such as ammonium persulfate, sodium persulfate, and potassium persulfate.

The amount of the thermal radical polymerization initiator added relative to 100 parts by mass of the radical-polymerizable compound included in the photocurable resin composition is preferably 0.1 parts by mass or more and 15 parts by mass or less, more preferably 0.1 parts by mass or more and 10 parts by mass or less. In the case of excessively adding the polymerization initiator, the molecular weight may not increase, which may result in degradation of the heat resistance or the impact resistance.

Other Component (E)

The photocurable resin composition may contain another component (E) as long as an object and advantages of the present disclosure are not impaired.

As the other component (E), a property modifier for imparting a desired property to the cured product, a photosensitizer, a polymerization initiation auxiliary, a leveling agent, a wettability improver, a surfactant, a plasticizer, an ultraviolet absorbent, and a silane coupling agent may be included. An inorganic filler, a pigment, a dye, an antioxidant, a flame retardant, a thickening agent, a defoaming agent, and the like may be included.

The amount of the other component (E) added relative to 100 parts by mass of the total amount of the polyfunctional radical-polymerizable compound (A) and the monofunctional radical-polymerizable compound (B) is preferably 0.05 parts by mass or more and 25 parts by mass or less, more preferably 0.1 parts by mass or more and 20 parts by mass or less. When such a range is satisfied, without degradation of the modulus of elasticity or the impact resistance of the resultant cured product, a desired property can be imparted to the cured product or the photocurable resin composition.

Examples of the property modifier for imparting a desired property to the cured product include resins such as epoxy resin, polyurethane, polychloroprene, polyester, polysiloxane, petroleum resin, xylene resin, ketone resin, and cellulose resin, engineering plastics such as polycarbonate, modified polyphenylene ether, polyamide, polyacetal, polyethylene terephthalate, polybutylene terephthalate, ultra-high-molecular-weight polyethylene, polyphenyl sulfone, polysulfone, polyarylate, polyetherimide, polyether ether ketone, polyphenylene sulfide, polyethersulfone, polyamide-imide, liquid crystal polymer, polytetrafluoroethylene, polychlorotrifluoroethylene, and polyvinylidene fluoride, fluorine-based oligomer, silicone-based oligomer, polysulfide-based oligomer, soft metals such as gold, silver, and lead, and layered crystalline structure substances such as graphite, molybdenum disulfide, tungsten disulfide, boron nitride, graphite fluoride, calcium fluoride, barium fluoride, lithium fluoride, silicon nitride, and molybdenum selenide.

Examples of the photosensitizer include polymerization inhibitors such as phenothiazine and 2,6-di-t-butyl-4-methylphenol, benzoin compounds, acetophenone compounds, anthraquinone compounds, thioxanthone compounds, ketal compounds, benzophenone compounds, tertiary amine compounds, and xanthone compounds.

Method for Producing Object

As a method for curing a photocurable resin composition according to the present disclosure to provide an object, publicly known stereolithography can be suitably used. A representative example of preferred stereolithography is a method including a step of repeating a step of, on the basis of slice data generated from three-dimensional geometric data of the production target (three-dimensional model), curing the photocurable resin composition at a predetermined thickness. The stereolithography can be roughly divided into two methods, the free surface method and the constrained surface method.

FIGURE illustrates an example of the configuration of a stereolithography apparatus 100 using the free surface method. The stereolithography apparatus 100 includes a vat 11 containing a photocurable resin composition 10 in liquid form. Within the vat 11, a fabrication stage 12 is disposed such that it can be driven in the vertical direction by a driving shaft 13. For an optical energy ray 15 emitted from a light source 14 and used for curing the photocurable resin composition 10, the irradiation position is changed by a galvanomirror 16 controlled by a control unit 18 in accordance with the slice data, and the surface of the photocurable resin composition 10 is scanned. FIGURE illustrates the scanning range indicated by the thick broken line.

The thickness d of the photocurable resin composition 10 cured with the optical energy ray 15 is a value determined in accordance with the setting during generation of the slice data, and affects the accuracy of the resultant object (reproducibility of the three-dimensional geometric data of the object fabricated). The thickness d is provided by the control unit 18 controlling the driving amount of the driving shaft 13.

First, the control unit 18 controls the driving shaft 13 on the basis of the setting to supply the photocurable resin composition at the thickness d onto the stage 12. The photocurable resin composition in the liquid form on the stage 12 is selectively irradiated with an optical energy ray on the basis of the slice data so as to provide a cured layer having a desired pattern, to form the cured layer. Subsequently, the stage 12 is moved in the direction of the white arrow, so that an uncured photocurable resin composition is supplied at the thickness d onto the surface of the cured layer. Subsequently, irradiation with the optical energy ray 15 based on the slice data is performed, to form a cured product joined to the cured layer previously formed. This layer-curing step can be repeated, to thereby provide a target three-dimensional fabricated object 17.

During irradiation of the surface formed of the photocurable resin composition with an actinic energy ray to form a cured layer having a predetermined geometric pattern, an optical energy ray concentrated into a spot form or a line form can be used to cure the resin by the dot-by-dot drawing process or the line-by-line drawing process. Alternatively, through a planar lithography mask formed by arranging a plurality of micro optical shutters such as liquid crystal shutters or digital micro mirror shutters, an actinic energy ray may be applied in a planar form to cure the resin.

As with the free surface method, the constrained surface method is preferably employed for the fabrication. A stereolithography apparatus using the constrained surface method has a configuration in which the stage 12 of the stereolithography apparatus 100 in FIGURE is disposed so as to bring the fabricated object above the liquid surface, and the light radiation means is disposed under the vat 11. A representative example of fabrication by the constrained surface method is as follows. First, the support surface of the support stage disposed so as to be freely movable up and down and the bottom surface of the vat containing the photocurable resin composition are positioned with a predetermined distance therebetween; to the gap between the support surface of the support stage and the bottom surface of the vat, the photocurable resin composition is supplied. Subsequently, from the bottom surface side of the vat containing the photocurable resin composition, a laser light source or a projector is used to selectively irradiate the photocurable resin composition between the support surface of the stage and the bottom surface of the vat, with light in accordance with the slice data. The irradiation with light cures the photocurable resin composition between the support surface of the stage and the bottom surface of the vat, to form a solid cured layer. Subsequently, the support stage is moved up, so that the cured layer is separated from the bottom surface of the vat.

Subsequently, the height of the support stage is adjusted such that the cured layer formed on the support stage and the bottom surface of the vat have a predetermined distance therebetween. Subsequently, as with the above-described procedures, the photocurable resin composition is supplied to the gap between the bottom surface of the vat and the cured layer, and irradiated with light in accordance with the slice data, to thereby form a new cured layer between the photo-cured layer and the bottom surface of the vat. This step is repeated plural times, to thereby provide a fabricated object in which a plurality of cured layers are stacked and joined together.

The fabricated object obtained in this manner is taken out from the vat 11; the unreacted photocurable resin composition remaining on the surface is removed and subsequently, as needed, post-processing is performed to thereby provide the target object.

Examples of the post-processing include washing, post-cure, grinding, polishing, and assembly.

Examples of the washing agent used for the washing include alcohol-based organic solvents represented by alcohols such as isopropyl alcohol and ethyl alcohol. Other examples include ketone-based organic solvents represented by acetone, ethyl acetate, and methyl ethyl ketone and aliphatic organic solvents represented by terpens.

After the washing, as needed, post-cure by irradiation with light, irradiation with heat, or both of them may be performed. The post-cure can cure the unreacted photocurable resin composition that may remain in the surface of or within the fabricated object to suppress stickiness of the surface of the three-dimensional fabricated object, and also can increase the initial strength of the three-dimensional fabricated object.

Examples of the optical energy ray used for fabrication of the three-dimensional fabricated object include ultraviolet radiation, an electron beam, X-rays, and radiations. In particular, ultraviolet radiation having wavelengths of 300 nm or more and 450 nm or less is preferably used from the viewpoint of being economical. Examples of the light source configured to generate ultraviolet radiation include ultraviolet lasers (for example, Ar laser and He—Cd laser), mercury lamps, xenon lamps, halogen lamps, and fluorescent lamps. In particular, laser light sources have a high condensation capability, can shorten the fabrication time with an increased energy level, and can achieve high fabrication accuracy, and hence are preferably employed.

EXAMPLES

Hereinafter, Examples according to the present disclosure will be described; however, the present disclosure is not limited to these Examples.

Materials Used

The following is the list of materials used in Examples and Comparative Examples.

Polyfunctional Radical-Polymerizable Compound (A)

Polyfunctional Urethane (Meth)Acrylate (a1)

a1-1: polycarbonate-based urethane acrylate; "CN9001NS" (manufactured by Arkema, bifunctional, number-average molecular weight/weight-average molecular weight (measured value): $1.3\times10^3/5.4\times10^3$ a1-2: polyester-based urethane acrylate; "KAYARAD UXT-6100" (manufactured by Nippon Kayaku Co., Ltd., bifunctional, number-average molecular weight/weight-average molecular weight (measured value): $2.7\times10^3/6.0\times10^3$)

Polyfunctional Radical-Polymerizable Compound (a2) Other than Component (a1)

a2-1: polyether-based urethane acrylate; "KAYARAD UX-6101" (bifunctional, number-average molecular weight/weight-average molecular weight (measured value): $1.0\times10^3/6.7\times10^3$, radical-polymerizable functional group equivalent: 500 g/eq, manufactured by Nippon Kayaku Co., Ltd.)

a2-2: ethoxylated isocyanuric acid triacrylate "A-9300" (molecular weight: 423, radical-polymerizable functional group equivalent: 141 g/eq, manufactured by Shin Nakamura Chemical Co., Ltd.)

a2-3: polycarbonatediol diacrylate "UM-90(1/3)DM" (molecular weight: about 900, radical-polymerizable functional group equivalent: about 450 g/eq, manufactured by Ube Industries, Ltd.)

Monofunctional Radical-Polymerizable Compound (B)

B-1: N-vinyl-ε-caprolactam

B-2: acryloylmorpholine; "ACMO" (manufactured by KJ Chemicals Corporation)

B-3: diacetoneacrylamide; "DAAM" (manufactured by KJ Chemicals Corporation)

B-4: vinylmethyloxazolidinone; "VMOX" (manufactured by BASF)

B-5: isobornyl acrylate

Rubber Particles (C)

C-1: Kane Ace M-511 (manufactured by KANEKA CORPORATION); rubber particles having a core-shell structure in which the cores are formed of crosslinked butadiene rubber and the shells are formed of polymethyl methacrylate C'-1: METABLEN W-600A (manufactured by Mitsubishi Chemical Corporation); rubber particles having a core-shell structure in which the cores are formed of acrylic rubber and the shells are formed of polymethyl methacrylate Acetone dispersion liquids of Rubber particles C-1 and C'-1 were produced in the following manner.

Production of Acetone Dispersion Liquid of Rubber Particles C-1

Rubber particles C-1 (20 parts by mass) and 80 parts by mass of acetone were mixed together and dispersion was caused using an ultrasonic homogenizer until primary particles were formed, to thereby provide an acetone dispersion liquid of Core-shell rubber particles C-1. Core-shell rubber particles C-1 were measured by the dynamic light scattering method and the average particle size was found to be 0.23 μm.

Production of Acetone Dispersion Liquid of Rubber Particles C'-1

Rubber particles C'-1 (20 parts by mass) and 80 parts by mass of acetone were mixed together and dispersion was caused using an ultrasonic homogenizer until primary particles were formed, to thereby provide an acetone dispersion liquid of Core-shell rubber particles C'-1. Core-shell rubber particles C'-1 were measured by the dynamic light scattering method and the average particle size was found to be 0.36 μm.

Radical Polymerization Initiator (D)

D-1: photo-radical generator; "Irgacure819" (manufactured by BASF)

Production of Photocurable Resin Composition

The materials were formulated in mixing ratios in Table 1 and mixed to reach homogeneity. Such mixtures were mixed with the acetone dispersion liquid of Rubber particles C-1 or C'-1 and the volatile component, acetone was removed to thereby provide photocurable resin compositions of Examples 1 to 8 and Comparative Examples 1 to 6.

Preparation of Test Specimens

The photocurable resin compositions prepared were used to prepare cured products in the following manner. First, a mold for a length of 80 mm, a width of 10 mm, and a thickness of 4 mm was placed between two quartz glass plates; into the mold, such a photocurable resin composition was injected. The injected photocurable resin composition was irradiated with, using an ultraviolet irradiation apparatus (manufactured by HOYA CANDEO OPTRONICS CORPORATION, trade name "LIGHT SOURCE EXECURE3000"), ultraviolet radiation at 5 $mW/cm^2$ from alternately each of both sides of the mold for 180 seconds twice. The resultant cured product was placed into a heating oven at 70° C. and heat-treated for 2 hour, to thereby provide a test specimen having a length of 80 mm, a width of 10 mm, and a thickness of 4 mm.

Evaluation

Weight-Average Molecular Weight

In a gel permeation chromatography (Gel Permeation Chromatography; GPC) apparatus (manufactured by Tosoh Corporation, HLC-8220GPC), two Shodex GPC LF-804 columns (manufactured by SHOWA DENKO K. K., exclusion limit molecular weight: $2\times10^6$, separation range: 300 to $2\times10^6$) connected in series were disposed, and the measurement was performed at 40° C., using THF as the developing solvent and an RI (Refractive Index, differential refractive index) detector. The determined weight-average molecular weight is a value calibrated using polystyrene standards.

Average Particle Size of Rubber Particles

A particle sizing apparatus (manufactured by Malvern Panalytical, Zetasizer Nano ZS) was used; into glass cells, about 1 ml of diluted acetone dispersion liquids of rubber particles (C-1, C-2) were placed and the average particle sizes (Z-Average) were measured at 25° C.

Viscosity of Photocurable Resin Composition

The viscosity of the photocurable resin composition was measured by the rotational rheometer method. Specifically, a viscoelasticity measurement instrument (Physica MCR302, manufactured by Anton Paar GmbH) was used to perform the measurement in the following manner.

Into the measurement instrument equipped with a cone-plate measurement jig (CP25-2, manufactured by Anton Paar GmbH; diameter: 25 mm, 2°), about 0.5 mL of the sample is filled and controlled to 25° C. The measurement was performed under a condition of a constant shear rate of 5 $s^{-1}$ and at data intervals of 6 seconds, and the value at 120 seconds was determined as the viscosity. Such viscosities were evaluated in accordance with ranks below. Ranks A and B correspond to viscosities suitable for stereolithography while Rank C corresponds to excessively high viscosities unsuitable for stereolithography.

A: a viscosity of 2.0 Pa·s or less

B: a viscosity of more than 2.0 Pa·s and 5.0 Pa·s or less

C: a viscosity of more than 5.0 Pa·s

Temperature of Deflection Under Load

The test specimen was treated in accordance with JIS K 7191-2: a heat distortion tester (manufactured by Toyo Seiki Seisaku-sho, Ltd., trade name "No. 533 HDT Tester 3M-2") was used to heat the test specimen under a flexural stress of 1.80 MPa from room temperature at 2° C./min. The temperature at which the amount of deflection of the test specimen reached 0.34 mm was determined as the temperature of deflection under load, which was used as the index of the heat resistance. The results will be described in Table 1. The heat resistance was evaluated in accordance with ranks below. Ranks A and B correspond to temperatures of deflection under load acceptable for actual products while Rank C corresponds to low temperatures of deflection under load unsuitable for actual products.

A: a temperature of deflection under load of 70° C. or more

B: a temperature of deflection under load of 50° C. or more and less than 70° C.

C: a temperature of deflection under load of less than 50° C.

Charpy Impact Strength

A notching apparatus (manufactured by Toyo Seiki Seisaku-sho, Ltd., trade name "Notching Tool A-4") was used in accordance with JIS K 7111 to form a 45° notch (notch) having a depth of 2 mm in a central portion of the test specimen. An impact tester (manufactured by Toyo Seiki Seisaku-sho, Ltd., trade name "IMPACT TESTER IT") was used to break the test specimen from the backside of the notch at an energy of 2 J. The energy required to achieve the breakage was calculated from the swinging-up angle (after breakage of the test specimen) of the hammer having been swung up to 150° and defined as the Charpy impact strength, which was used as the index of the impact resistance. The results will be described in Table 1. The impact resistance was evaluated in accordance with ranks below. Charpy impact strengths much higher than those of cured products of existing photocurable compositions are evaluated as Rank A; Charpy impact strengths higher than those of cured products of existing photocurable compositions are evaluated as Rank B. Charpy impact strengths similar to or less than those of cured products of existing photocurable compositions are evaluated as Rank C.

A: a Charpy impact strength of 10 $kJ/m^2$ or more

B: a Charpy impact strength of 7 $kJ/m^2$ or more and less than 10 $kJ/m^2$

C: a Charpy impact strength of less than 7 $kJ/m^2$

Flexural Modulus of Elasticity

As an evaluation for a mechanical property, a flexural test was performed in accordance with JISK6911-1995 "Testing methods for thermosetting plastics", to measure flexural moduli of elasticity. The measurement was performed using a tensile testing instrument (manufactured by A&D Company, Limited, trade name "TENSILON Universal Material Testing Instrument RTF-1250"). The moduli of elasticity were evaluated in accordance with ranks below. Ranks A and B correspond to flexural moduli of elasticity similar to or higher than the flexural modulus of elasticity of the commonly used ABS while Rank C corresponds to flexural moduli of elasticity lower than the flexural modulus of elasticity of ABS.

A: a flexural modulus of elasticity of 2.2 GPa or more

B: a flexural modulus of elasticity of 1.7 GPa or more and less than 2.2 GPa

C: a flexural modulus of elasticity of less than 1.7 GPa

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Polyfunctional | a1-1 | 32.5 | 37.5 | 37.5 | 37.5 | 30.0 | 37.5 | 32.5 | 35.0 | | 32.5 |
| radical- | a1-2 | | | | | | | | | 32.5 | |
| polymerizable | a2-1 | | | | | | | | | | |
| compound | a2-2 | 5.0 | 5.0 | 5.0 | 5.0 | 5.0 | 5.0 | 5.0 | | 5.0 | 5.0 |
| (parts by mass) | a2-3 | | | | | | | | | | |
| Monofunctional | B-1 | 42.5 | 42.5 | 42.5 | 42.5 | 40.0 | | | 50.0 | 42.5 | 42.5 |
| radical- | B-2 | | | | | | | 42.5 | | | |
| polymerizable | B-3 | 5.0 | | | | 25.0 | | 5.0 | | 5.0 | 5.0 |
| compound | B-4 | | | | | | 42.5 | | | | |
| (parts by mass) | B-5 | 15.0 | 15.0 | 15.0 | 15.0 | | 15.0 | 15.0 | 15.0 | 15.0 | 15.0 |

TABLE 1-continued

| | | | | | | | | | | | |
|---|---|---|---|---|---|---|---|---|---|---|---|
| Rubber particles (parts by mass) | C-1 | 11.1 | 8.7 | 5.3 | 3.1 | 11.1 | 8.7 | 11.1 | 8.7 | 11.1 | 14.3 |
| | C'-1 | | | | | | | | | | |
| Radical polymerization initiator (parts by mass) | D-1 | 1.0 | 1.0 | 1.0 | 1.0 | 1.0 | 1.0 | 1.0 | 1.0 | 1.0 | 1.0 |
| Temperature of deflection under load (° C.) | | 71A | 76A | 76A | 78A | 63B | 77A | 64B | 75A | 60B | 70A |
| Charpy impact strength (kJ/m$^2$) | | 10.3A | 11.0A | 8.2B | 7.8B | 9.2B | 9.0B | 9.0B | 9.2B | 7.2B | 10.5A |
| Flexural modulus of elasticity (GPa) | | 2.3A | 2.2A | 2.4A | 2.5A | 1.9B | 2.3A | 2.1B | 2.2A | 1.8B | 1.8B |
| Viscosity of composition (Pa · s) | | 2.2B | 1.9A | 1.6A | 0.9A | 2.1B | 1.2A | 2.0B | 1.4A | 2.0B | 2.7B |

| | | Example | | | | | | | Comparative Example | |
|---|---|---|---|---|---|---|---|---|---|---|
| | | 11 | 12 | 13 | 14 | 15 | 16 | 17 | 1 | 2 |
| Polyfunctional radical-polymerizable compound (parts by mass) | a1-1 | 30.0 | 15.0 | 45.0 | 30.0 | 30.0 | 35.0 | 30.0 | | 30.0 |
| | a1-2 | | | | | | | | | |
| | a2-1 | | | | | | | | 32.5 | |
| | a2-2 | 5.0 | 5.0 | | 10.0 | 20.0 | | | 5.0 | 5.0 |
| | a2-3 | | | | | | | 25.0 | | |
| Monofunctional radical-polymerizable compound (parts by mass) | B-1 | 40.0 | 50.0 | 40.0 | 40.0 | 40.0 | 35.0 | 45.0 | 42.5 | 40.0 |
| | B-2 | | | | | | | | | |
| | B-3 | 25.0 | 15.0 | | 10.0 | 10.0 | | | 5.0 | 10.0 |
| | B-4 | | | | | | | | | |
| | B-5 | | 15.0 | 15.0 | 10.0 | | 30.0 | | 15.0 | 15.0 |
| Rubber particles (parts by mass) | C-1 | 17.6 | 17.6 | 5.3 | 13.6 | 13.6 | 8.7 | 8.7 | 11.1 | 18.5 |
| | C'-1 | | | | | | | | | |
| Radical polymerization initiator (parts by mass) | D-1 | 1.0 | 1.0 | 1.0 | 1.0 | 1.0 | 1.0 | 1.0 | 1.0 | 1.0 |
| Temperature of deflection under load (° C.) | | 60B | 65B | 62B | 73A | 78A | 70A | 58B | 63B | 66B |
| Charpy impact strength (kJ/m$^2$) | | 11.9A | 8.5B | 9.4B | 8.2B | 7.1B | 7.2B | 10.1A | 10.5A | 11.0A |
| Flexural modulus of elasticity (GPa) | | 1.7B | 1.9B | 2.1B | 2.0B | 2.2B | 2.3A | 2.0B | 1.6C | 1.6C |
| Viscosity of composition (Pa · s) | | 3.2B | 1.2A | 3.5B | 3.3B | 3.6B | 2.2B | 2.8B | 1.8A | 5.1C |

| | | Comparative Example | | | | | | |
|---|---|---|---|---|---|---|---|---|
| | | 3 | 4 | 5 | 6 | 7 | 8 | 9 |
| Polyfunctional radical-polymerizable compound (parts by mass) | a1-1 | 37.5 | 30.0 | 37.5 | | 30.0 | 5.0 | 65.0 |
| | a1-2 | | | | | | | |
| | a2-1 | | | | | | | |
| | a2-2 | | 5.0 | 5.0 | | 5.0 | 5.0 | |
| | a2-3 | | | | | | | |
| Monofunctional radical-polymerizable compound (parts by mass) | B-1 | 42.5 | 40.0 | 42.5 | 40.0 | 40.0 | 50.0 | 20.0 |
| | B-2 | | | | | | | |
| | B-3 | | 25.0 | | | 10.0 | 25.0 | |
| | B-4 | | | | | | | |
| | B-5 | 15.0 | | 15.0 | 60.0 | 15.0 | 15.0 | 15.0 |
| Rubber particles (parts by mass) | C-1 | 1.5 | | | 8.7 | 21.2 | 14.3 | 5.3 |
| | C'-1 | | 11.1 | | | | | |
| Radical polymerization initiator (parts by mass) | D-1 | 1.0 | 1.0 | 1.0 | 1.0 | 1.0 | 1.0 | 1.0 |
| Temperature of deflection under load (° C.) | | 78A | 53B | 81A | 62B | 67B | 55B | 49C |
| Charpy impact strength (kJ/m$^2$) | | 4.5C | 8.0B | 3.5C | <1.0C | 11.0A | 3.2C | 8.7B |
| Flexural modulus of elasticity (GPa) | | 2.5A | 1.6C | 2.6A | 2.2A | 1.6C | 1.8B | 1.8B |
| Viscosity of composition (Pa · s) | | 0.6A | 12.6C | 0.5A | <0.1A | 9.2C | 0.4A | 9.5C |

As described in Table 1, the photocurable resin compositions prepared in Examples 1 to 17 had viscosities in a range suitable as fabrication materials used for stereolithography. The obtained cured products had high moduli of elasticity, high impact resistance, and high heat resistance.

The cured product according to Comparative Example 1 formed from the photocurable resin composition not containing the polycarbonate-based urethane acrylate, but containing the polyether-based urethane acrylate alone was not considerably different in impact strength from the cured product according to Example 1. However, the modulus of elasticity and the heat resistance were both low. The cured product according to Comparative Example 2 formed from the photocurable resin composition having a high content of the rubber particles (C) of 18.5 parts by mass had a very high viscosity unsuitable for fabrication by stereolithography. The cured product according to Comparative Example 3 formed from the photocurable resin composition having a low content of the rubber particles (C) of 1.5 parts by mass did not have sufficiently improved impact resistance.

The photocurable resin composition containing the acrylic rubber particles had a very high viscosity that was impractical for fabrication by stereolithography. The resultant cured product, Comparative Example 4, had a low temperature of deflection under load and a low flexural modulus of elasticity.

Comparative Example 5 not including the rubber particles (C) and Comparative Example 6 not including the polycarbonate-based urethane acrylate both had low impact resistance.

The cured product of Comparative Example 7 formed from the photocurable resin composition in which the content of the rubber particles (C) was 18 parts by mass or more also had a low flexural modulus of elasticity and had a high viscosity.

Comparative Example 8 formed from the photocurable resin composition in which the content of the polyfunctional urethane (meth)acrylate (a1) relative to 100 parts by mass of the total amount of the polyfunctional radical-polymerizable compound (A) and the monofunctional radical-polymerizable compound (B) was less than 10 parts by mass had low impact resistance. Conversely, Comparative Example 9 formed from the photocurable resin composition in which the content of the polyfunctional urethane (meth)acrylate (a1) was more than 60 parts by mass had low heat resistance.

The above-described results have demonstrated that the present disclosure provides photocurable resin compositions having viscosities suitable for stereolithography and cured products provided by curing the photocurable resin compositions and having high moduli of elasticity, high impact resistance, and high heat resistance.

The present disclosure can provide a photocurable resin composition that can form a cured product having a high modulus of elasticity, high impact resistance, and high heat resistance and that is suitable for three-dimensional fabrication.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. A photocurable resin composition comprising:

a polyfunctional radical-polymerizable compound (A);

a monofunctional radical-polymerizable compound (B);

rubber particles (C) formed of a diene-based compound; and a radical polymerization initiator (D), wherein the polyfunctional radical-polymerizable compound (A) includes a polyfunctional urethane (meth)acrylate (a1) intramolecularly including at least two (meth)acryloyl groups and two urethane groups and including a structure represented by formula (1) or (2), a content of the polyfunctional urethane (meth)acrylate (a1) relative to 100 parts by mass of a total amount of the polyfunctional radical-polymerizable compound (A) and the monofunctional radical-polymerizable compound (B) is, 10 parts by mass or more and 60 parts by mass or less, and a content of the rubber particles (C) relative to 100 parts by mass of the total amount of the polyfunctional radical-polymerizable compound (A) and the monofunctional radical-polymerizable compound (B) is 2 parts by mass or more and less than 18 parts by mass, (1)

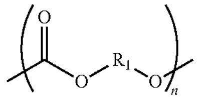

(2)

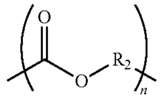

in formulas (1) and (2), $R_1$ and $R_2$ are each independently a hydrocarbon group including an alkylene group having 1 to 18 carbon atoms and n is 2 to 50.

2. The photocurable resin composition according to claim 1, wherein the content of the polyfunctional urethane (meth)acrylate (a1) relative to 100 parts by mass of the total amount of the polyfunctional radical-polymerizable compound (A) and the monofunctional radical-polymerizable compound (B) is 15 parts by mass or more and 45 parts by mass or less.

3. The photocurable resin composition according to claim 1, wherein, in formulas (1) and (2) above, $R_1$ and $R_2$ are each independently any one or a combination of two or more selected from the group consisting of $-(CH_2)_m-$ (m=1 to 18), $-(CH_2)_hC(CH_3)_i-$ (h=0 to 15, i=0 to 15), and $-(CH_2)_jCH(CH_3)(CH_2)_k-$ (j=0 to 16, k=0 to 16).

4. The photocurable resin composition according to claim 3, wherein, in formulas (1) and (2) above, $R_1$ and $R_2$ each include $-(CH_2)_m-$ (m=4 to 9).

5. The photocurable resin composition according to claim 1, wherein the polyfunctional urethane (meth)acrylate (a1) has a weight-average molecular weight of 1000 or more and 60000 or less determined by molecular-weight calibration using polystyrene standards.

6. The photocurable resin composition according to claim 5, wherein the weight-average molecular weight of the polyfunctional urethane (meth)acrylate (a1) determined by molecular-weight calibration using polystyrene standards is 2000 or more and 50000 or less.

7. The photocurable resin composition according to claim 1, wherein the polyfunctional urethane (meth)acrylate (a1) has a radical-polymerizable functional group equivalent of 300 g/eq or more.

8. The photocurable resin composition according to claim 1, wherein the polyfunctional radical-polymerizable compound (A) includes a polyfunctional radical-polymerizable compound (a2) other than the polyfunctional urethane (meth)acrylate (a1).

9. The photocurable resin composition according to claim 8, wherein the polyfunctional radical-polymerizable compound (a2) includes an ethylenically unsaturated group.

10. The photocurable resin composition according to claim 9, wherein the polyfunctional radical-polymerizable compound (a2) is at least one selected from the group consisting of a polyfunctional (meth)acrylate-based compound, a vinyl ether group-containing (meth)acrylate-based compound, a polyfunctional (meth)acryloyl group-containing isocyanurate-based compound, a polyfunctional (meth) acrylamide-based compound, a polyfunctional maleimide-based compound, a polyfunctional vinyl ether-based compound, and a polyfunctional aromatic vinyl-based compound.

11. The photocurable resin composition according to claim 8, wherein the polyfunctional radical-polymerizable compound (a2) is a compound having a radical-polymerizable functional group equivalent of less than 300 g/eq, and wherein a content of the compound relative to 100 parts by mass of the total amount of the polyfunctional radical-polymerizable compound (A) and the monofunctional radical-polymerizable compound (B) is 20 parts by mass or less.

12. The photocurable resin composition according to claim 8, wherein the polyfunctional radical-polymerizable compound (a2) is a compound having a radical-polymerizable functional group equivalent of 300 g/eq or more, and wherein a content of the compound relative to 100 parts by mass of the total amount of the polyfunctional radical-polymerizable compound (A) and the monofunctional radical-polymerizable compound (B) is 40 parts by mass or less.

13. The photocurable resin composition according to claim 1, wherein a content of the monofunctional radical-polymerizable compound (B) relative to 100 parts by mass of the total amount of the polyfunctional radical-polymerizable compound (A) and the monofunctional radical-polymerizable compound (B) is 40 parts by mass or more and 85 parts by mass or less.

14. The photocurable resin composition according to claim 1, wherein the monofunctional radical-polymerizable compound (B) is at least one compound selected from the group consisting of a monofunctional acrylamide-based compound, a monofunctional acrylate-based compound, and an N-vinyl compound.

15. The photocurable resin composition according to claim 14, wherein the monofunctional radical-polymerizable compound (B) is an N-vinyl compound, and wherein a content of an N-vinyl group relative to a total amount of a radical-polymerizable functional group in the photocurable resin composition is 80 mol % or less.

16. The photocurable resin composition according to claim 14, wherein the monofunctional radical-polymerizable compound (B) is an N-vinyl compound, and wherein the N-vinyl compound includes a cyclic structure.

17. The photocurable resin composition according to claim 16, wherein the N-vinyl compound is at least one compound selected from the group consisting of N-vinylpyrrolidone, N-vinyl-ε-caprolactam, N-vinylimidazole, N-vinylmorpholine, and vinylmethyloxazolidinone.

18. The photocurable resin composition according to claim 14, wherein the monofunctional radical-polymerizable compound (B) is a monofunctional acrylamide-based compound, and wherein the monofunctional acrylamide-based compound includes a cyclic structure.

19. The photocurable resin composition according to claim 18, wherein the monofunctional acrylamide-based compound is acryloylmorpholine or phenylacrylamide.

20. The photocurable resin composition according to claim 14, wherein the monofunctional radical-polymerizable compound (B) is a monofunctional methacrylate-based compound, and wherein a content of a methacrylate group relative to a total amount of a radical-polymerizable functional group in the photocurable resin composition is 25 mol % or less.

21. The photocurable resin composition according to claim 1, wherein the monofunctional radical-polymerizable compound (B) is a compound including an alicyclic hydrocarbon group, and wherein a content of the compound relative to 100 parts by mass of the total amount of the polyfunctional radical-polymerizable compound (A) and the monofunctional radical-polymerizable compound (B) is 50 parts by mass or less.

22. The photocurable resin composition according to claim 1, wherein the rubber particles (C) include at least one selected from the group consisting of butadiene rubber, crosslinked butadiene rubber, and styrene/butadiene copolymer rubber.

23. The photocurable resin composition according to claim 1, wherein the rubber particles (C) have a core-shell structure in which at least a portion of a core containing rubber is covered with a shell formed of a polymer of a radical-polymerizable compound.

24. The photocurable resin composition according to claim 1, wherein the rubber particles (C) have an average particle size of 20 nm or more and 10 μm or less.

25. A cured product formed by polymerizing the photocurable resin composition according to claim 1.

26. A method for producing an object by stereolithography, the method comprising:

a step of placing a photocurable resin composition to a predetermined thickness; and a step of irradiating, on a basis of slice data of a three-dimensional model, the photocurable resin composition with optical energy to cure the photocurable resin composition, wherein the photocurable resin composition is the photocurable resin composition according to claim 1.

27. The method for producing an object according to claim 26, wherein the optical energy is light emitted from a laser light source or a projector.

28. The photocurable resin composition according to claim 1, wherein the monofunctional radical-polymerizable compound (B) is not a compound including an alicyclic hydrocarbon group.

29. The photocurable resin composition according to claim 8, wherein a ratio of a mass of the polyfunctional urethane (meth)acrylate (a1) relative to a total mass of the polyfunctional radical-polymerizable compound (A), the monofunctional radical-polymerizable compound (B), and the rubber particles (C) to a mass of the polyfunctional radical-polymerizable compound (a2) relative to the total mass of the polyfunctional radical-polymerizable compound (A), the monofunctional radical-polymerizable compound (B), and the rubber particles (C) is in a range from 7.5:1.0 to 6.0:5.0.

30. The photocurable resin composition according to claim 8, wherein the resin composition comprises a monofunctional radical-polymerizable compound other than the monofunctional radical-polymerizable compound (B).

* * * * *